[19] United States Patent
Wang et al.

[11] Patent Number: 5,190,659
[45] Date of Patent: Mar. 2, 1993

[54] CONTAMINATION REMOVAL SYSTEM EMPLOYING FILTRATION AND PLURAL ULTRAVIOLET AND CHEMICAL TREATMENT STEPS AND TREATMENT MODE CONTROLLER

[75] Inventors: Lawrence K. Wang, Latham; Lubomry Kurylko, New Providence, N.J.; Mu Hao S. Wang, Latham, N.Y.

[73] Assignee: International Environmental Systems Inc., Pittsfield, Mass.

[21] Appl. No.: 549,596

[22] Filed: Jul. 6, 1990

[51] Int. Cl.$^5$ .............. B01D 24/46; B01D 41/02; B01D 36/00; B01D 37/04
[52] U.S. Cl. .................. 210/663; 210/135; 210/143; 210/192; 210/193; 210/259; 210/269; 210/420; 210/670; 210/748; 210/798; 210/806; 422/24; 422/186.3
[58] Field of Search ................. 210/87–89, 210/102, 106–108, 130, 133, 134, 136, 138–142, 143, 193, 206, 219, 254, 257.1, 258–260, 269, 273, 277, 278, 411, 418, 424, 425, 426, 484, 500.1, 503, 504, 506, 195.1, 135, 104, 420; 137/625.46, 597, 624.11, 625.42, 605

[56] References Cited

U.S. PATENT DOCUMENTS

| | | | |
|---|---|---|---|
| 103,280 | 5/1870 | Barrows | 210/425 |
| 619,838 | 2/1899 | Potter | 210/193 |
| 2,993,599 | 7/1961 | Moon et al. | 210/193 |
| 3,064,816 | 11/1962 | Griswold | 210/193 |
| 4,082,664 | 4/1978 | Lindstol | 210/333.1 |
| 4,377,485 | 3/1983 | Krofta | 210/704 |
| 4,430,220 | 2/1984 | Litzenburger | 210/333.1 |
| 4,626,345 | 12/1986 | Krofta | 210/104 |
| 4,626,346 | 12/1986 | Hall et al. | 210/110 |
| 4,642,192 | 2/1987 | Heskett | 210/638 |
| 4,673,494 | 6/1987 | Krofta | 210/202 |
| 4,673,498 | 6/1987 | Swinney et al. | 210/275 |
| 4,973,404 | 11/1990 | Weber et al. | 210/425 |

FOREIGN PATENT DOCUMENTS 0000842 of 1870 United Kingdom ............... 210/425

OTHER PUBLICATIONS

Wang, L. K., "Using Air Flotation and Filtration in Color and Giardia Removal", Technical Report No. PB89-148398/AS, the U.S. Dept. of Commerce, National Technical Information Service, Springfield, Va. (Oct. 1988).

Wang, L. K. and M. H. S. Wang, "Advanced Precoat Filtration and Competitive Processes for Water Purification," Technical paper presented at the Harvard Club, Harvard University, Boston, Mass. (23 pages, Jan. 28, 1989).

Primary Examiner—Robert A. Dawson
Assistant Examiner—Joseph Drodge

[57] ABSTRACT

An improved cross-flow granular filtration system involving the use of ultraviolet, ozonation, chlorination, reactive granular filtration media, chemical regeneration, and central flow control is described. The process system and apparatus includes a liquid pump, a central flow control, a cross-flow reactive pressure filter, a process tank and at least one chemical feeder. The filter media are of reactive and granular type, including diatomaceous earth, granular activated carbon, granular metal medium, greensand, neutralizing sand, activated alumina, ion exchange resins, polymeric adsorbents, coal, porous plastic medium, porous stainless steel medium, porous ceramic medium, bacteriostatic filter medium, or combinations thereof. Alternatively a downflow or upflow filter is substituted for the crossflow reactive pressure filter. The process tank contains and handles regeneration chemicals or filter aids for the reactive filter media. The process system is compact and simple, and cost-effectively removes suspended, dissolved, volatile and living contaminants from liquid.

20 Claims, 9 Drawing Sheets

CONTAMINATION REMOVAL SYSTEM EMPLOYING FILTRATION AND PLURAL ULTRAVIOLET AND CHEMICAL TREATMENT STEPS AND TREATMENT MODE CONTROLLER

BACKGROUND OF THE INVENTION

1. Field of the Invention

The present invention relates to a reactive filtration apparatus and process for removal of living, suspended and soluble contaminants from liquid. Specifically, the filtration apparatus and process of this invention involves the use of reactive filtration media and at least one central flow control for contaminants removal and the ease of filter operation.

There are two types of conventional granular filters: slow sand filters and rapid sand filters. A typical conventional slow sand filter is commonly operated at below 0.16 gpm per square foot, using unstratified non-reactive sands with an effective size of 0.3 mm to 0.35 mm and a uniformity coefficient of 2 to 3. Aside from the low hydraulic load, conventional slow sand filters appear to lack the technological sophistication of their successors, conventional rapid sand filters which are operated at 2 gpm per square foot or higher, using stratified non-reactive sands with an effective size of 0.45 mm and higher and an uniformity coefficient of 1.5 or lower. Both types of conventional filters have operation and maintenance problems. Ordinarily the surface of a partially dewatered slow sand filter bed is raked after about 2 weeks of filter run, and again a week or so later to break through the surface accumulations. At the end of a month, the top portion up to 2 inches of the slow sand bed and the surface accumulations must be scraped off for disposal. Conventional rapid sand filters are superior to conventional slow sand filters for water filtration, but are comparatively more complicate, and can only be operated by experienced operators.

Furthermore, both conventional slow sand filters and conventional rapid sand filters remove only suspended particulates from water. Soluble contaminants, such as iron, manganese heavy metals, volatile organic compounds, and hardness can not be removed by any conventional sand filters.

Recently, the design of granular filters has been advanced to include granular activated carbons, activated alumina, anion exchange resins and cation ion exchange resins for removal of soluble contaminants. Other state-of-the-art processes for water purification include reverse osmosis, electrodialysis, packed column, ultrafiltration, microfiltration, diatomaceous earth filtration, flotation-filtration, etc. The common problems for the state-of-the-art as well as conventional filters are their high cost and time-consuming procedures for operation and regeneration.

The present invention adopts reactive granular filter media for specific liquid-solid separation, and adopts at least one central flow control for both regeneration of filter media and ease of routine operation. The present invention's apparatus is compact, and its process is simple and cost-effective, and can remove suspended, dissolved, volatile and living contaminants from liquid.

2. Description of the Prior Art

None of the prior arts including Barrows (U.S. Pat. No. 103280; 5/1870), Potter (U.S. Pat. No. 619838, 2/1899), Moon et al (U.S. Pat. No 2993599, 7/1961), Griswold (U.S. Pat. No. 3064816, 11/1962), Lindstol (U.S. Pat. No. 4082664, 4/1978), Litzenburger (U.S. Pat. No. 4430220, 2/1984), Hall et al (U.S. Pat. No. 4626346, 12/1986), Heskett (U.S. Pat. No. 4642192, 1987), Swinney et al (U.S. Pat. No 4673498, 6/1987), Krofta (U.S. Pat. No. 4377485, 3/1983; No. 4626345, 12/1986; 4673494, 6/1987), and Weber et al (U.S. Pat. No. 4973404, 11/1990) relate to the use of ultraviolet (UV) light, reactive granular filter media, chemical regeneration, central flow control, and crossflow hydraulic flow pattern in combination for water purification as in the case of this present invention.

In accordance with a recent publication by Wang & Wang (1989), conventional crossflow separation processes include reverse osmosis, ultrafiltration, microfiltration and gas permeation which are all membrane processes. The present invention relates to a central controlled crossflow granular reactive filtration process in which the filter media are regenerative with UV, ozone, hydrogen peroxide, hypochlorite, permanganate, and by which both living and non-living contaminants are efficiently removed under a pressurized rotating crossflow hydraulic condition for a prolonged filter run.

All conventional granular media filtration processes adapt either an upflow or a down-flow hydraulic operation during which the direction of influent flow is parallel with the flow path of granular media filtration. In the case of the present invention's crossflow granular reactive filtration process, the direction of influent flow is perpendicular to the flow path of granular media filtration.

Non-reactive granular filtration processes remove mainly suspended particulates from water. A reactive granular filtration process, as in the case of the present invention removes dissolve and living contaminants in addition to its capability for suspended particulates removal.

The major advantages of the present invention over conventional filtration processes include: (a) pretreatment and/or post-treatment of reactive granular filtration with ultraviolet (UV), ozonation, hydrogen peroxide, permanganate, and dry hypochlorite for total destruction of living contaminants; and (b) adoption of central flow control for the ease of nine granular reactive filtration operations: normal reactive filtration, backwash, bypass, flushing, chemical preparation, recirculation, rinse, precoat I, and precoat II. Both total destruction of living contaminants and simple one control operation make the present invention extremely attractive to the single families and small institutions for their point-of-entry (POE) in-house operations.

The similarities and dissimilarities between the present invention and the selected important prior arts are further described below.

British Patent No. 842, issued to Chemesha et al in March, 1870 is of interest in citing "safety valves", which are now required for any pressure systems including the present invention. While the safety valves and pipes are the required parts of the present invention, they are not considered to be major components of the present invention which places emphasis on a central controlled crossflow granular reactive filtration process.

All Krofta processes (U.S. Pat. Nos. 4,377,485, 4,626,345 and 4,673,494) are similar to a flotation-filtration system described by Wang (Oct., 1988). While the flotation-filtration process is feasible for removal of color, trihalomethane precursors and Giardia Cysts, the flotation-filtration process system involves the use of too many valves and treatment steps, and thus can only be adopted by municipalities which have skilled operators. The treatment steps of a flotation-filtration system include: chemical mixing, chemical flocculation, dissolved air flotation, non-reactive sand filtration, and chlorination, which are different from the present invention.

Filtration apparatus which adopt multi-port control values for feeding filter aids are shown in U.S. Pat. No. 3,064,816 issued Nov. 20, 1962 to David E. Griswold and in U.S. Pat. No. 4,973,404 issued Nov. 27, 1990 to Roland E. Weber, John J. Pavlovich and Lawrence K. Wang. Both filtration apparatus (U.S. Pat. Nos. 3,064,816 and 4,973,404) involve the use of too many valves and non-reactive and non-regenerative granular filter media, for removal of suspended contaminants. The present invention involves the use of only one or two central flow controls (depending upon the hydraulic capacities) and reactive/regenerative granular filter media for removing suspended, dissolved and living contaminants.

A prior filtration apparatus using multiport valves for cleaning of filters and delivering adequate pressure is described in U.S. Pat. No. 103,280, issued May 24, 1870 to Thomas Barrows. Barrows' patent is particularly directed to a non-reactive, non-regenerative pressure filter using several three-way valves. Although Barrows' apparatus can be operated horizontally or vertically, it is not a crossflow separation process in accordance with the state-of-the-art engineering definition. Currently only the membrane processes (reverse osmosis, microfiltration, ulrafiltration, and gas permeation) are designed and classified as crossflow separation processes in which the influent water ($Q_i$) is fed to an inlet of said apparatus at one end traveling in parallel with the membrane filtration medium; its concentrate ($Q_e$) is discharged in small volume at the opposite end; and the filter effluent ($Q_e = Q_i - Q_c$) passing through the membrane filter medium is discharged from the second outlet also at the opposite end of said apparatus. The present invention relates to a crossflow granular filtration process and apparatus in which the granular filter media (instead of membrane filter medium) is reactive/regenerative (instead of non-reactive/non-regenerative), and one central flow control valve has nine operational modes (instead of several three-way valves).

Still another apparatus for filtering water through porous media is shown in U.S. Pat. No. 619,838, issued Feb. 21, 1899, to Zoroaster F. Potter. Specifically, Potter's patent relates to a filtration apparatus comprising a chemical process tank coupled to a chemical feed system, an old central flow control valve with a handle for dialing and handling limited water flows only, a pressure filter containing non-reactive/non-regenerative granular filter media, an influent inlet, product liquid discharge pipe, waste drain, many multiple on-off ports, all connected with a piping system which contains a plurality of safety valves. The process of the present invention relates to a pressurized crossflow filtration using reactive/regenerative granular filter media, and with UV, ozone, hydrogen peroxide and hypochlorite as pretreatment and/or post-treatment. The apparatus of the present invention comprises a process tank coupled to a feed system for pretreatment and filter media regeneration (instead of feeding chemical only as in the case of Potter's patent), a modern central flow control valve with nine process operational modes and handling both water flows and filter media slurry (instead of limited operational modes and handling only water flows), a pressure filter containing reactive/regenerative granular filter media (instead of non-reactive/non-regenerative granular filter media) and being operated in a rotating crossflow hydraulic pattern (instead of non-crossflow hydraulic pattern), an influent inlet, a product liquid discharge pipe and a waste drain, all connected with the modern central flow control valve (instead of all connected with a piping system). Besides, simplicity is the major improvement of the present invention, because there are not many multiple on-off valves.

Still another prior filtration apparatus for automatic flow control is shown in U.S. Pat. No. 2,993,599 issued Jul. 25, 1961 to John J. Moon and Harold M. Hawkins. Their patent discloses a new control technology for automation of a precoat filtration process involving the use of a cycle timer, air inlets, air vents, wash solvent lines, sluice solvent lines, a precoat mix tank, a pressure filter, a filter feed line, an effluent line, a wash recycle line, a wash vapor receiver, drains, a filter cake discharge line, a pressure pump, safety valves, pressure gauges, flow meters, over 20 flow control valves, and a turbidity monitor. The apparatus of the present invention also comprises a pressure filter, a filter feed line, an effluent line, a recycle line, drains, a pressure pump, pressure gauges, a flow meter, a safety valve, and a tank. However, in the case of the present invention, the major improvements are: one central flow control valve (instead of over 20 valves), one multi-purpose tank (instead of one single-purpose tank just for precoating), one pressure filter containing reactive/regenerative granular filter media (instead of non-reactive/non-regenerative granular filter media), being operated as rotating crossflow hydraulic pattern horizontally or vertically (instead of non-crossflow hydraulic pattern), and having adequate pretreatment and post-treatment for removal of living, non-living, suspended and dissolved contaminants (instead of having no pretreatment and post-treatment for removal of mainly non-living suspended contaminants), all aiming at simplicity in operation and high efficiency in water purification. In addition, the present invention's apparatus does not require complicated automation when applied to single families and small institutions because of its one central flow control operation. For higher flow municipal applications, the present invention is automated mechanically and electrically (instead of electronically as in the case of Moon et al) again because of its simple central flow control operation.

A method for treating fluid to remove undesirable constituents contained therein such as chlorine and nitrate constituents is disclosed in the U.S. Pat. No. 4,642,192, issued Feb. 10, 1987 to Don E. Heskett. Heskett's method includes passing fluid containing chlorine and nitrate through a bed of granular metal particulate matter, having favorable redox potentials relative to the redox potentials of the undesirable constituents so as to establish conditions for spontaneous oxidation and reduction reactions between the undesirable constituents and the metal particles. Heskett's method relates to water treatment using only the metal particles. The present invention relates to a central controlled filtration system with pretreatment and post-treatment, and the metal septum (instead of metal particles) is one of eleven filter media adapted by the crossflow pressure filter.

SUMMARY OF THE INVENTION

In accordance with the present invention, an improved method and apparatus for removing suspended particulates, volatile organic compounds, heavy metals, iron, manganese, hardness, oil and grease, bacteria, etc. from a contaminated liquid comprises the following steps, facilities and alterations:

packing a pressure filter with septum (i.e. filter element) and granular filter media which are selected from a group including diatomaceous earth, granular activated carbon, granular metal medium, greensand, neutralizing sand, activated alumina, ion exchange resins, polymeric adsorbents, coal, porous plastic medium, porous stainless steel medium, porous mild steel medium, porous ceramic medium, porous alloy medium, bacteriostatic filter medium, or combinations thereof, selecting the hydraulic flow patterns of said pressure filter among upward-crossflow, downward crossflow, or horizontal-crossflow, conventional upflow, or conventional downflow, loading a process tank with the regenerating chemicals or filter aids or said filter media, discharging the contaminated liquid through an influent pipe and an ultraviolet (UV) pretreatment unit, into said apparatus which includes a pressure pump, a central flow control, the pressure filter, the process tank, chemical feeders, a piping system, flow meters, pressure gauges and safety valves, selecting either manual operation or automatic operation, deciding a desired mode of operation (filtration, backwash, bypass, flushing, chemical preparation, recirculation, precoat, rinse) by dialing either manually or automatically the selected operational mode marked on the center flow control which consists of a wide-open inlet port, an on-off port to said pressure filter, an on-off port from said pressure filter, an on-off outlet port to product liquid discharge pipe, an on-off outlet port to said process tank, and an on-off outlet port to said waste drain, operating said apparatus at the filtration mode by pumping and dialing the central flow control to "filtration", allowing the on-off ports to said process tank and said waste drain to be closed, and all other ports of said central flow control to be open, when the UV pretreatment unit is on, and said feeder is on for additional pretreatment, or operating said apparatus at the backwash mode by pumping and dialing the central flow control to "backwash", allowing the on-off ports to said process tank and said product liquid discharge pipe to be closed, and all other ports of said central flow control to be open, or operating said apparatus at the bypass mode by pumping and dialing the central flow control to "bypass", allowing the on-off ports to and from said pressure filter, and to said process tank and said waste drain to be closed, and all remaining ports of said central flow control to be open, or operating said apparatus at the flushing mode by pumping and dialing the control flow control to "flushing", allowing the on-off ports connecting to said pressure filter, process tank and product liquid discharge pipe to be all closed, and the remaining ports to be open, or operating said apparatus at the chemical preparation mode by pumping and dialing the central flow control to "preparation", allowing the on-off ports connecting to said pressure filter, product liquid discharge pipe and waste drain to be closed, and the remaining ports of said control flow control to be open, in the presence of chemical feed and the influent contaminated liquid, or operating said apparatus at recirculation mode by pumping and dialing the central flow control to "recirculation/precoat I", allowing the on-off ports connecting to said product liquid discharge pipe and waste drain to be closed, and the remaining ports to be open, or operating said apparatus at regular precoat mode by pumping, pushing the precoat button and dialing the central flow control to "recirculation/precoat I", allowing the on-off ports connecting to said product liquid discharge pipe and waste drain to be closed, when the filter media slurry is being recirculated through said pump, central flow control, pressure filter, central flow control and process tank for precoating said filter media onto said pressure filter, or operating said apparatus at special precoat mode by pumping, pushing the precoat button, and dialing the central flow control to "rinse/precoat II", allowing the on-off ports connecting to said product liquid discharge pipe and process tank to be closed, and all remaining ports of said central flow control to be open, when the filter media slurry is being fed to the piping system by the chemical feed system, or operating said apparatus at rinse (purging) mode by pumping and dialing the central flow control to "rinse/precoat II", without pushing the precoat button, allowing the on-off ports connecting to said product liquid discharge pipe and process tank to be closed, and all remaining ports of said central flow control to be open, when the feeder is closed, post-treating the filter effluent along said product liquid discharge pipe, with ultraviolet (UV), ozone, hydrogen peroxide, or hypochlorite, during the filtration mode, and discharging the post-treated product liquid from the end of said product liquid discharge pipe.

While the primary object of this invention is to provide a new and improved filtration method, another object of this invention is for the provision of a new and improved filtration apparatus.

BRIEF DESCRIPTION OF THE DRAWINGS

The present invention will become more fully understood from the description given herein below and the accompanying drawings which are given by way of illustration, and thus are not limitative of said present invention, and wherein.

DESCRIPTION OF THE PREFERRED EMBODIMENTS

Figure 1:
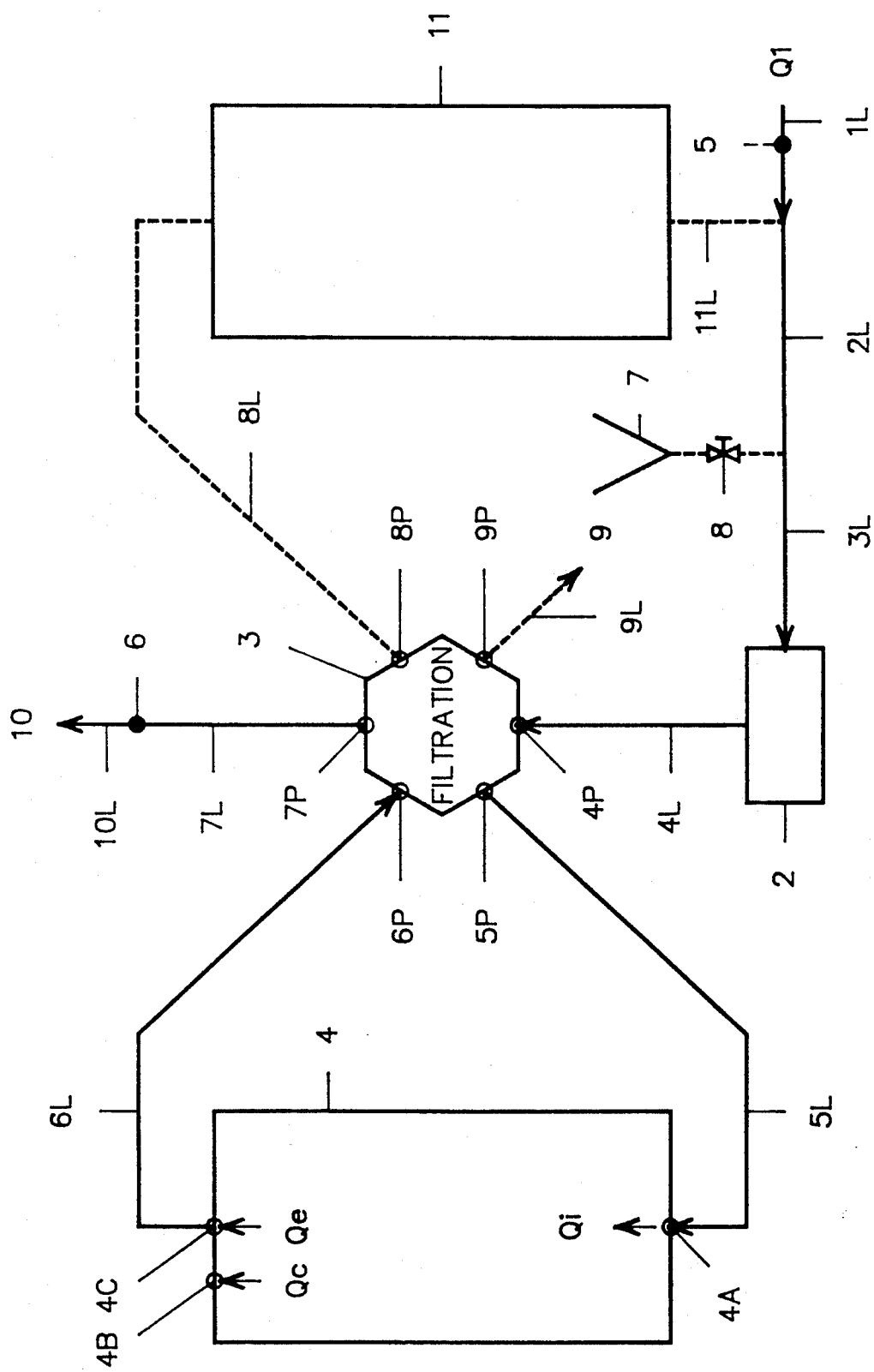
FIGS. 1 to 9 inclusive present the flow diagram of filtration mode, backwash mode, by-pass mode, flushing mode, preparation mode, recirculation mode, precoat I mode, rinse mode, and precoat II mode, respectively, of an improved filtration, according to the present invention.

The present invention relates to a central controlled crossflow granular reactive/regenerative filtration process and apparatus by which the water is pretreated or post-treated with ultraviolet (UV), ozone, hydrogen peroxide and hypochlorite, and by which living, non-living, suspended and dissolved contaminants are efficiently removed from water under a pressurized rotating crossflow hydraulic pattern.

The major components of the present invention include a pretreatment UV unit 5, a pressure pump 2, a central flow control 3, a pressure filter 4, a post-treatment UV unit 6, a process tank 11, a chemical feed system 7, an operating valve 8, and a pipe line system 1L, 2L, 3L, 4L, 5L, 6L, 7L, 8L 9L, 10L & 11L, all shown in FIGS. 1 to 9.

Both pretreatment UV unit 1 and post-treatment UV unit 5 kill legionella as well as other pathogenic microorganisms by ultraviolet irradiation which has emerged as the best disinfection technology especially suitable for use with point-of-entry (POE) devices.

The multi-purpose chemical feed system 7 with its control valve 8 provide additional pretreatment to the contaminated liquid Q1 using ozone, hypochlorite (a free chlorine), hydrogen peroxide, potassium permanganate, or combinations thereof. With 0.2 mg/l of residual ozone, and 0.3 minute of contact time, over 99% of Legionella pneumophila was killed. With 0.5 mg/l (in terms of free chlorine) of calcium hypochlorite and 1 minute of contact time, again over 99% of Legionella pneumophila reduction was achieved. In the case of the present invention, calcium hypochlorite in dry tablet form is used for small POE disinfection operations and ozone and hydrogen peroxide are used for institutional operations.

Ozone ($O_3$), potassium permanganate ($KMnO_4$) or hydrogen peroxide ($H_2O_2$) is fed through the chemical feed system 7 for removal of iron and manganese by conversion of soluble iron and manganese in the contaminated liquid Q1 into their insoluble forms, so they can be effectively filtered out by the pressure filter 4 in accordance with the following chemical reactions:

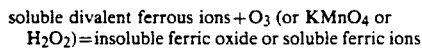
soluble divalent ferrous ions + $O_3$ (or $KMnO_4$ or $H_2O_2$) = insoluble ferric oxide or soluble ferric ions

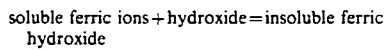
soluble ferric ions + hydroxide = insoluble ferric hydroxide

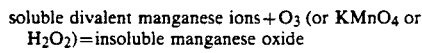
soluble divalent manganese ions + $O_3$ (or $KMnO_4$ or $H_2O_2$) = insoluble manganese oxide For a prolonged filtration operation, the pressure filter 4 is normally operated under a rotating crossflow hydraulic pattern which can be an upward-crossflow, a downward-crossflow or a horizontal crossflow. During normal filtration operation, the filter influent Qi enters said pressure filter 4 at filter inlet 4A, filter effluent Qe exits at filter outlet 4C, and a small volume of concentrate Qc exists at another filter outlet 4B. In case the filter outlet 4B is shut off, the pressure filter 4 is then operated under conventional upflow, downflow or horizontal flow hydraulically, depending on the inlet-outlet arrangement.

The pressure filter 4 of the present invention normally is packed with reactive granular filter media which are selected from a group including granular activated carbon, granular metal medium, greensand, neutralizing sand, activated alumina, cationic exchange resins, anionic exchange resins, polymeric adsorbents, coal, porous plastic medium, porous stainless steel medium, porous ceramic medium, porous alloy medium, bacteriostatis filter medium, manganese dioxide, diatomaceous earth or combinations thereof. In a preferred embodiment, porous stainless steel medium, porous ceramic medium, porous plastic medium or porous alloy medium is placed inside said pressure filter 4 as the septum (i.e. filter elements) for supporting the reactive filter media which are granular activated carbon, polymeric adsorbents, activated alumina, greensand, neutralizing sand, coal, diatomaceous earth, manganese dioxide, bacteriostatic filter medium, or combinations thereof. Several selected examples are given below for illustration of the treatment efficiency of said pressure filter 4.

The first example of reactive granular filter media to be used in said pressure filter 4 is the silver impregnated granular activated carbon (GAC), which is designed to slowly release biocide (i.e. low concentration of silver ions) into the pathogen-carrying water. The silver impregnated GAC maintains a constant residual concentration of silver ions regardless of the presence of microorganisms; therefore it is called constant-release disinfectant/adsorbent. The silver impregnated GAC not only destroys pathogenic microorganisms, but also removes toxic dissolved organics (such as trihalomethanes, phenols, formaldehydes, etc.), toxic dissolved inorganics (such as lead, excessive chlorine, hydrogen sulfide, etc.) and insoluble suspended solids. Under normal tap water supply conditions that trihalomethanes, coliform bacteria, and lead concentrations in the tap water (i.e. influent liquid to said apparatus) will not be as high as 200 ppb, 135 coliform colonies/100 ml, and 150 ppb, respectively. The pressure filter 4 containing the silver impregnated GAC reduces trihalomethanes, coliform bacteria and lead to 6 ppb, 0 colonies/100 ml and 17 ppb, respectively. The silver impregnated GAC also removes bad taste, odor, hydrogen sulfide from water. The virgin GAC can also be adapted for removal of toxic organics, heavy metals, bad taste, odor and hydrogen sulfide, but not for disinfection.

The second reactive granular filter media to be used in the pressure filter 4 are the iodinated, strong-base resins that release iodine upon demand to microorganisms in water. Bacteria including *Staphylococcus aureus, E. Coli, Pseudomonas aeruginosa, Salmonella pullorum* each at the concentration of $2.3 \times 10^4$ colonies/ml, and viruses including Polyoma, Newcastle Disease, Poliovirus, each the concentration of $2.0 \times 10^4$ plaque forming units per milliliter (pfu/ml) are totally disinfected after the pathogen-carrying water is contacted with the iodinated strong base resins.

The third reactive granular filter media to be used in the pressure filter 4 is similar to the medium described in the U.S. Pat. No. 4,642,192, issued Feb. 10, 1987 to Don E. Heskett, and called brass KDF. Heskett's filter medium works on the redox principle of dissimilar metals and lasts from ten to twenty times longer than GAC for removal of excessive amount of chlorine from tap water, or for removal of algae from reservoir water or swimming pool water. The brass making up the KDF medium contains approximately: 59.2% copper, 35.2% zinc, 2.5% lead and 0.2% iron by weight. The brass KDF is commonly used in solid granular form as the filter medium in conventional filters, but it is used in porous cartridge form as one of the septums in the pressure filter 4 of the present invention.

The fourth reactive granular filter medium suitable for used in the pressure filter 4 is the manganese greensand from the mineral glauconite, also known as Ferrosand, which operates on the chemical principle of oxidation and reduction and the catalytic effect of manganese oxides, for removal of excessive soluble iron and manganese from water, without the need for long reaction times and/or high pH levels. The pressure filter 4 is installed either vertically or horizontally. The greensand is not only reactive, but also regenerative. About 2 oz. of potassium permanganate is required for regeneration of 1 cubic foot of greensand for its reuse. Like other granular filter media, greensand also removes insoluble suspended contaminants. In addition, it removes hydrogen sulfide up to 5 mg/1. Assuming Z represents the black manganese greensand granules, the following two chemical reactions show how the soluble manganese $Mn^{+2}$ and soluble iron $Fe^{+2}$ are removed by the pressure filter 4:

$$Z^*MnO_2 + Mn^{+2} + Fe^{+2} = Z^*Mn_2O_3 + MnO_2 + Fe^{+3}$$

$$Fe^{+3} + 3OH^- \text{(hydroxide ions)} = Fe(OH)_3$$

Both $MnO_2$ and $Fe(OH)_3$ with underlines are insoluble precipitates which are removed by filtration and backwash. The following is the chemical reaction showing how the spent manganese greensand is regenerated with $KMnO_4$ solution:

$$Z^*Mn_2O_3 + KMnO_4 = Z^*MnO_2 + K^+$$

The regenerated greensand $Z^*MnO_2$ can then be reused.

Manganese dioxide is a reactive granular filter medium similar to greensand, and is the fifth filter medium for use in the pressure filter 4. Adsorption of many toxic soluble heavy metals (nickel, cadmium, zinc, lead, copper, silver, and seleium) onto manganese has been scientifically established.

Activated alumina having a formula of $(Al_2O_3)n^*H_2SO_4$ contains mainly aluminum oxides and is the seventh reactive granular filter medium adopted by the pressure filter 4 of the present invention. Activated alumina when packed in said pressure filter 4 is very effective for controlling fluoride ($F^-$) in drinking water. In general, it is necessary to control and maintain the concentration of fluoride below 1 mg/1. The following is the chemical reaction for fluoride removal:

$$(Al_2O_3)n^*H_2SO_4 + 2F^- = (Al_2O_3)n^*2HF + SO_4$$

This filter medium, activated alumina, is also of a regenerative type. The spent activated alumina is regenerated with sulfuric acid $H_2SO_4$ or aluminum sulfate $Al_2(SO_4)_3$ for reuse:

$$(Al_2O_3)n^*2HF + SO_4^{--} = (Al_2O_3)n^*H_2SO_4 + 2F^-$$

Between 1 to 2 mg $F^-$ are removed per each gram of activated alumina, depending the particle size of the filter medium in the range of 0.6 to 5 mm at pH=8. Soluble cations that can be removed by activated alumina include uranium, zirconium, cerium, iron, titanium, mercury, lead, copper, silver, zinc, cobalt, nickel, thallium, and manganese. Soluble anions that can be removed by activated alumina include $AsO_4^{-3}$, $PO_4^{-3}$, $C_2O_4^{-2}$, $F^-$, $SO_3^{-2}$, $Fe(CN)_6^{-4}$, $CrO_4^{-2}$, $S_2O_3^{-2}$, $Fe(CN)_6^{-3}$, $Cr_2O_7^{-2}$, $NO_2^-$, $CNS^-$, $I^-$, $Br^-$, $Cl^-$, $NO_3^-$, $MnO_4^-$, $ClO_4^-$, $CH_3COO^-$ and $S^{-2}$. Removal of dissolved organics by activated alumina is improved by preoxidation with ozone or hydrogen peroxide, of this invention.

The neutralizing sand including Calcite and magnesium oxide (known as Corosex) are the eighth type of reactive granular filter media to be packed in said pressure filter 4 for the purpose of filtration as well as neutralization. Calcite is a crushed and screened white marble sand which is inexpensively used to neutralize acidic or low pH waters to produce a neutral non-corrosive product water. In theory, acidic water on contact with Calcite slowly dissolves the calcium carbonate filter media thus raises the pH. Calcite contains 95% of $CaCO_3$ and 3% of $MgCO_3$. The service flow rate is about 3 to 6 gpm/ft$^2$.

Another neutralizing sand, magnesium oxide, contains about 97% MgO, and is grayish white. Magnesium oxide, or Corosex, is specially processed hard, bead-like filter media adapted for use in said pressure filter 4 to neutralize extremely high acidity by chemical reaction, in turn, increasing the pH value of water. Downflow filtration operation is satisfactory on waters with a hardness of less than 5 gpg, or where it is combined with Calcite at a ratio of 50%–50%. Upflow filtration operation is generally recommended with hardness exceeding 5 gpg to prevent cementing of the filtration bed inside said pressure filter 4. The service rate of this reactive granular filter medium can be as high as 5 gpm/ft$^2$.

High capacity cation exchange resins are the ninth type of reactive granular filter media which are used inside said pressure filter 4 for removal of cationic soluble metals, calcium hardness, magnesium hardness, and cationic organic surfactants. Assuming E represents the fixed portion of the cation exchange resin granules, $M1^+$, $M2^{+2}$ & $M3^{+3}$ represent monovalent, divalent and trivalent, respectively, of soluble heavy metals ($Zn^{+2}$, $Cu^{+2}$, $Ag^+$, $Ni^{+2}$, $Se^{+2}$, $Cr^{+3}$, $Pb^{+2}$, $Fe^{+3}$, $Fe^{+2}$, $Mn^{+2}$, etc.), $Ca^{+2}$ represents calcium hardness, $Mg^{+2}$ represents magnesium hardness, $H^+$ represents hydrogen ion, and $T^+$ represents soluble cationic toxic organics, the removal reactions are as follows:

$$E^*H \text{ (cation exchange resin)} + M1^+ = E^*M1 \text{ (spent cation exchange resin)} + H^+$$

$$2E^*H \text{ (cation exchange resin)} + M2^{+2} = 2E^*0.5M2 \text{ (spent cation exchange resin)} + 2H^+$$

$$3E^*H \text{ (cation exchange resin)} + M3^{+3} = 3E^*0.333M3 \text{ (spent cation exchange resin)} + 3H^+$$

$$4E^*H \text{ (cation exchange resin)} + Ca^{+2} + Mg^{+2} = 2E^*0.5Ca + 2E^*0.5Mg + 4H$$

$$E^*H \text{ (cation exchange resin)} + T^+ = E^*T \text{ (spent cation exchange resin)} + H^+$$

$E^*H$ in the above equations represents the cation exchange resin in hydrogen form; so $E^*H$ releases $H^+$ in low concentration after reaction. In case the cation exchange resin in sodium form $E^*Na$ is used in replacement of $E^*H$, $Na^+$ (instead of $H^+$) will be released to water in the above equations; the spent cation exchange resins will be the same, however.

All spent cation exchange resins designated above can be effectively regenerated by using highly concentrated acid or brine (sodium chloride; NaCl) solutions as follows:

$$E^*M1 + H^+ \text{ (regenerant)} = E^*H \text{ (regenerated cation exchange resin)} + M1^+$$

$$2E^*0.5M2 + 2H^+ \text{ (regenerant)} = 2E^*H \text{ (regenerated cation exchange resin)} + M2^{+2}$$

$$3E^*0.333M3 + 3H^+ \text{ (regenerant)} = 3E^*H \text{ (regenerated cation exchange resin)} + M3^{+3}$$

$$2E^*0.5Ca + 2E^*0.5Mg + 4H^+ \text{ (regenerant)} = 4E^*H \text{ (regenerated cation exchange resin)} + Ca^{+2} + Mg^{+2}$$

$E^*T + H^+$ (regenerant) = $E^*H$ (regenerated cation exchange resin) + $T^+$ where $H^+$ ions are supplied by highly concentrated acid. All $E^*H$ on the right-hand side of equations are regenerated cation exchange resins in hydrogen form, and ready for reuse in said pressure filter 4; and $M1^+$, $M2^{+2}$, $M3^{+3}$, $Ca^{+2}$, $Mg^{+2}$ and $T^+$ are highly concentrated rejects ready to be discharged for waste disposal.

In case highly concentrated brine NaCl is used for regeneration of spent cation exchange resins, NaCl will provide $Na^+$ ions (instead of $H^+$ ions) for regeneration. The regenerated cation exchange resins will be in sodium form $E^*Na$ (instead of $E^*H$) and $M1^+$, $M2^{+2}$, $M3^{+3}$, $Ca^{+2}$, $Mg^{+2}$ and $T^+$ are also produced in the reject solutions. Accordingly, the cation exchange resins are reactive as well as regenerative granular filter media.

High capacity anion exchange resins belong to the tenth type of reactive granular filter media which are used inside said pressure filter 4 aiming at removal of anionic soluble impurities and toxics, including but not being limited to: $AsO_4^{-3}$, $PO_4^{-3}$, $C_2O_4^{-2}$, $F^-$, $SO_3^{-2}$, $Fe(CN)_6^{-4}$, $CrO_4^{-2}$, $S_2O_3^{-2}$, $SO_4^{-2}$, $Fe(CN)_6^{-3}$, $Cr_2O_7^{-2}$, $NO_2^{-1}$, $CNS^-$, $I^-$, $Br^-$, $Cl^-$, $NO_3^-$, $MnO_4^-$, $ClO_4^-$, $CH_3COO^-$, and $S^{-2}$. The above are the most common impurities in tap water. Examples are presented below showing how they are removed by anion exchange resin in hydroxide form $E^*OH$, and how the spent anion exchange resins are regenerated by strong alkaline solution such as sodium hydroxide NaOH. $A1^-$, $A2^{-2}$ & $A3^{-3}$ now represent soluble monovalent, divalent, and trivalent, respectively, of the above anionic impurities/toxics. E represents the fixed portion of the anion exchange resin granules, and $E^*OH$ is the anion exchange resin in hydroxide form.

$E^*OH$ (anion exchange resin) + $A1^-$ = $E^*A1$ (spent anion exchange resin) + $OH^-$ $2 E^*OH$ (anion exchange resin) + $A2^{-2}$ = $2 E^*0.5A2$ (spent anion exchange resin) + $2OH^-$ $3 E^*OH$ (anion exchange resin) + $A3^{-3}$ = $3E^*0.333 A3$ (spent anion exchange resin) + $3OH^-$ As shown in the above three equations, hydroxide ions $OH^-$ are released in low concentration to the treated water after anionic impurities/toxics are removed by the anion exchange resins.

When the anion exchange resins are exhausted and spent, they are due for regeneration with highly concentrated NaOH solution so the above three chemical equations can be forced to reverse:

$E^*A1 + OH^-$ (regenerant) = $E^*OH$ (regenerated anion exchange resin) + $A1^-$ $2 E^*0.5A2 + 2OH^-$ (regenerant) = $2E^*OH$ (regenerated anion exchange resin) + $A2^{-2}$ $3 E^*0.333A3 + 3OH^-$ (regenerant) = $3E^*OH$ (regenerated anion exchange resin) + $A3^{-3}$ where $A1^-$, $A2^{-2}$ and $A3^{-3}$ are the rejects in high concentration but low volume, ready to be discharged for waste disposal.

Diatomaceous earth (DE) is the non-reactive granular filter media commonly used in all conventional precoat filters for removal of non-living, insoluble, suspended contaminants from water. The process and apparatus of this invention involves the use of reactive granular filter media for removal of living, non-living, dissolved and suspended contaminants from water; besides, most of reactive granular filter media are regenerative. DE is adapted as the filter aid or filler in the present invention for filtration operation and cost-saving.

The reactive granular filter media adapted by the present invention are packed in the pressure filter 4 either as a fixed filtration bed or as a precoat filtration bed, either in the presence or in the absence of DE.

The central controlled filtration system with pretreatment and post-treatment, as in the case of the present invention, has nine operational modes: filtration (FIG. 1), backwash (FIG. 2), bypass (FIG. 3), flushing (FIG. 4), chemical preparation (FIG. 5), recirculation (FIG. 6), precoat I (FIG. 7), precoat II (FIG. 8) and rinse (FIG. 9), which can be chosen by dialing either manually or automatically, the operational mode marked on the central flow control 3.

More than one chemical feeders 7 and valves 8 can be provided to the apparatus of the present invention.

The apparatus of the present invention is of modular design, each comprising a piping system, a chemical feed system, a pump, a central flow control, a pretreatment unit and a post-treatment unit. One or more than one modules (each having different granular filter media) is installed together for a specific water treatment application. Since there is only one central flow control for each module, the automation is accomplished mechanically and electrically, although manual operation is also very simple and satisfactory.

The simplicity of the improved liquid filtration is fully illustrated in FIG. 1 to 9 by its minimum number of required valves (one central flow control valve and one chemical feed calibration valve as the minimum) although addition of more valves will not hinder the filtration operation.

Detailed description of operational features of the preferred embodiment is illustrated in FIGS. 1 to 9 inclusive which are a set of schematic diagrams of the present invention when applied to liquid filtration under different modes of operations.

Referring to FIG. 1, the influent liquid Q1 with UV pretreatment 5 and chemical pretreatment is pumped by a pump 2, through an influent pipe 1L, 2L, 3L and 4L to a central flow control 3, from which the pretreated influent liquid Qi goes to a pressure filter 4 through pipe 5L for treatment during the filtration mode. When operating said apparatus at the filtration mode by dialing the central flow control 3 to "filtration" (not shown), the on-off ports 8P and 9P to said process tank 7 and said waste drain 9L, respectively, are to be closed, and all other ports 4P, 5P, 6P & 7P of said central flow control 3 are open. The pressure filter 4 which is completely sealed during filtration operation, purifies said pretreated influent liquid Qi and returns the filter effluent Qe to said central flow control 3 through pipe 6L before its being discharged to pipe 7L for the UV post-treatment 6. The post-treated liquid is the product liquid 10 from the effluent pipe 10L. The on-off valve 4B of said pressure filter 4 is on for discharge of concentrate Qc in small volumetric rate for the crossflow operation, and is off for the non-crossflow operation.

Figure 2:
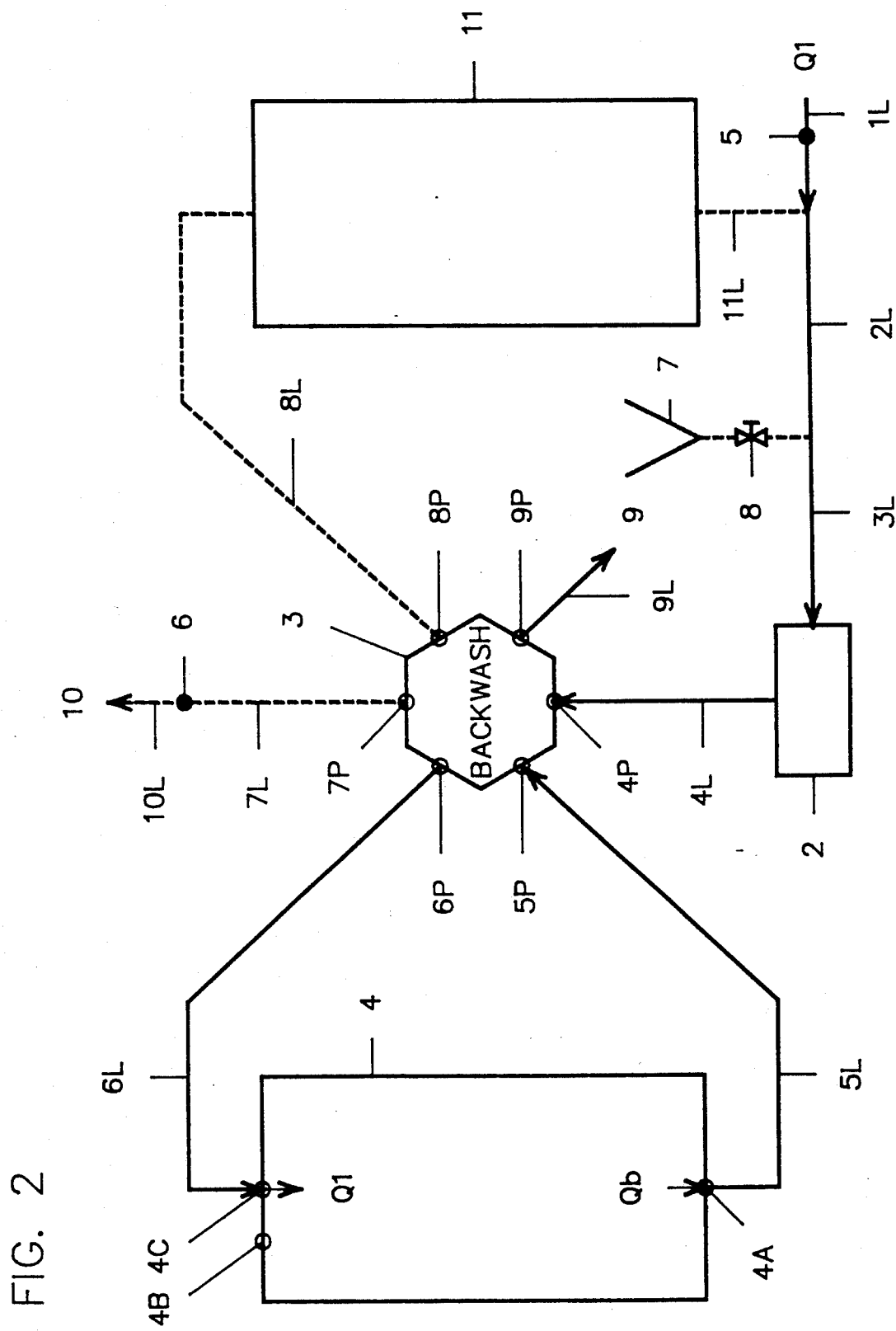

Referring FIG. 2, the pressure filter 4 which is completely sealed during filter backwash, receives reversed influent liquid Q1 flow from said pump 2 and said central flow control 3, through pipes 1L, 2L, 3L, 4L and 6L, self-cleans the granular filter media inside of said pressure filter 4 and returns the backwash wastewater Qb to said central flow control 3 before its being discharged to a waste drain 9L as the waste 9. When operating said apparatus at the backwash mode by pumping and dialing the central flow controls to "backwash" (not shown), the on-off ports 8P and 7P to said process tank 11 and said discharge pipe 7L, respectively, are closed, and all other ports 4P, 5P, 6P & 9P of said central flow control 3 are open. The on-off valves 4B and 8 are closed.

Figure 3:
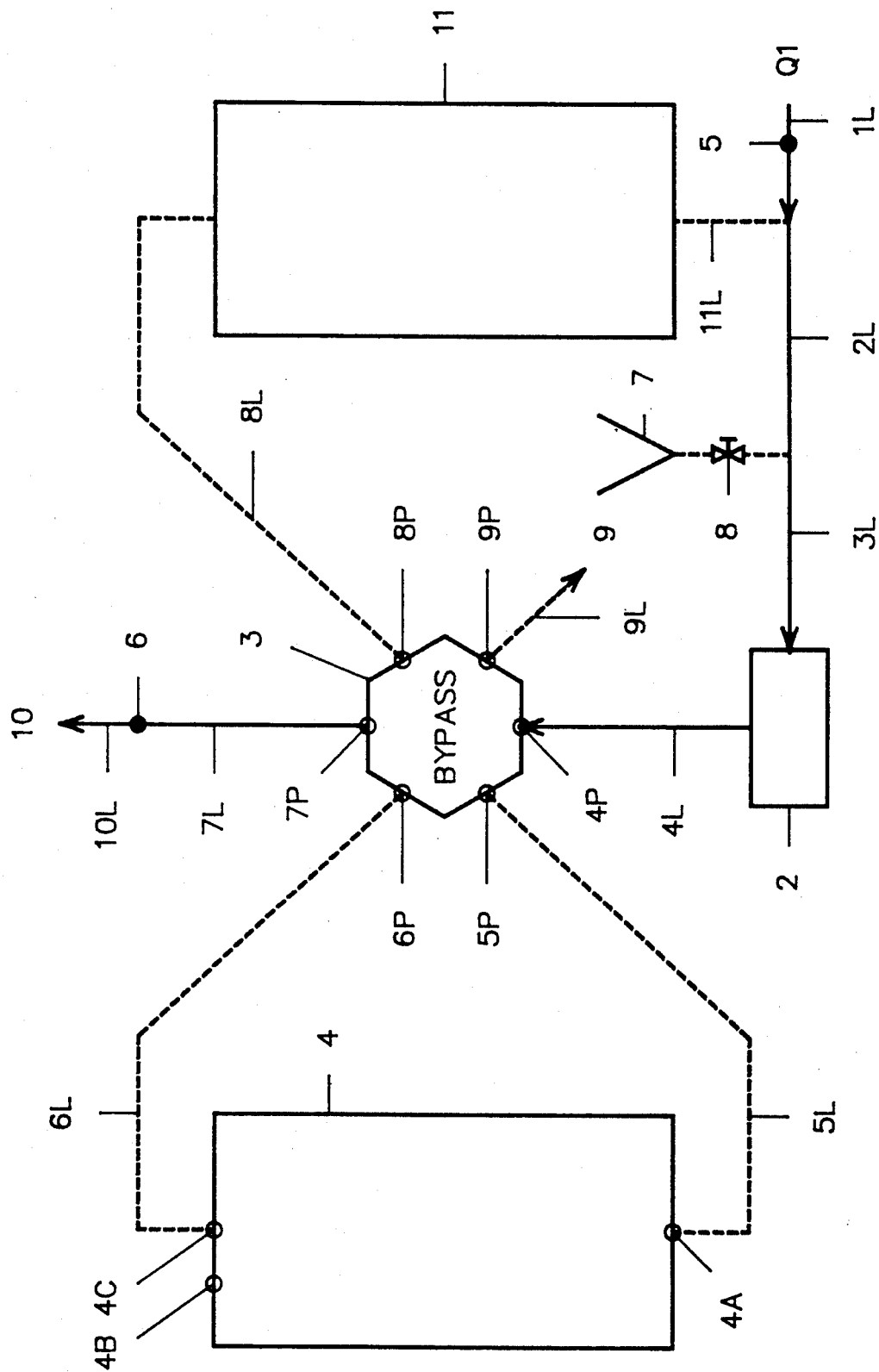

Referring to FIG. 3, the central flow control 3 receives said influent liquid QI from said pump 2 and discharges said influent liquid Q1 as the product liquid 10 directly during the bypass mode of operation. When operating said apparatus at the bypass mode by pumping and dialing the central flow control to "bypass" (not shown), the on-off ports 5P & 6P to and from said pressure filter 4, and the on-off ports 8P & 9P to said process tank 11 and said waste drain 9L are closed, and all remaining ports 4P & 7P of said central flow control 3 are open. It is a direct bypass if the influent liquid Q1 is not pretreated by UV pretreatment unit 5, and chemical feed system 7 and not post treated by UV post-treatment unit 6. It is a bypass of filtration if the influent liquid Q1 is pretreated and/or post-treated, except not filtered.

Figure 4:
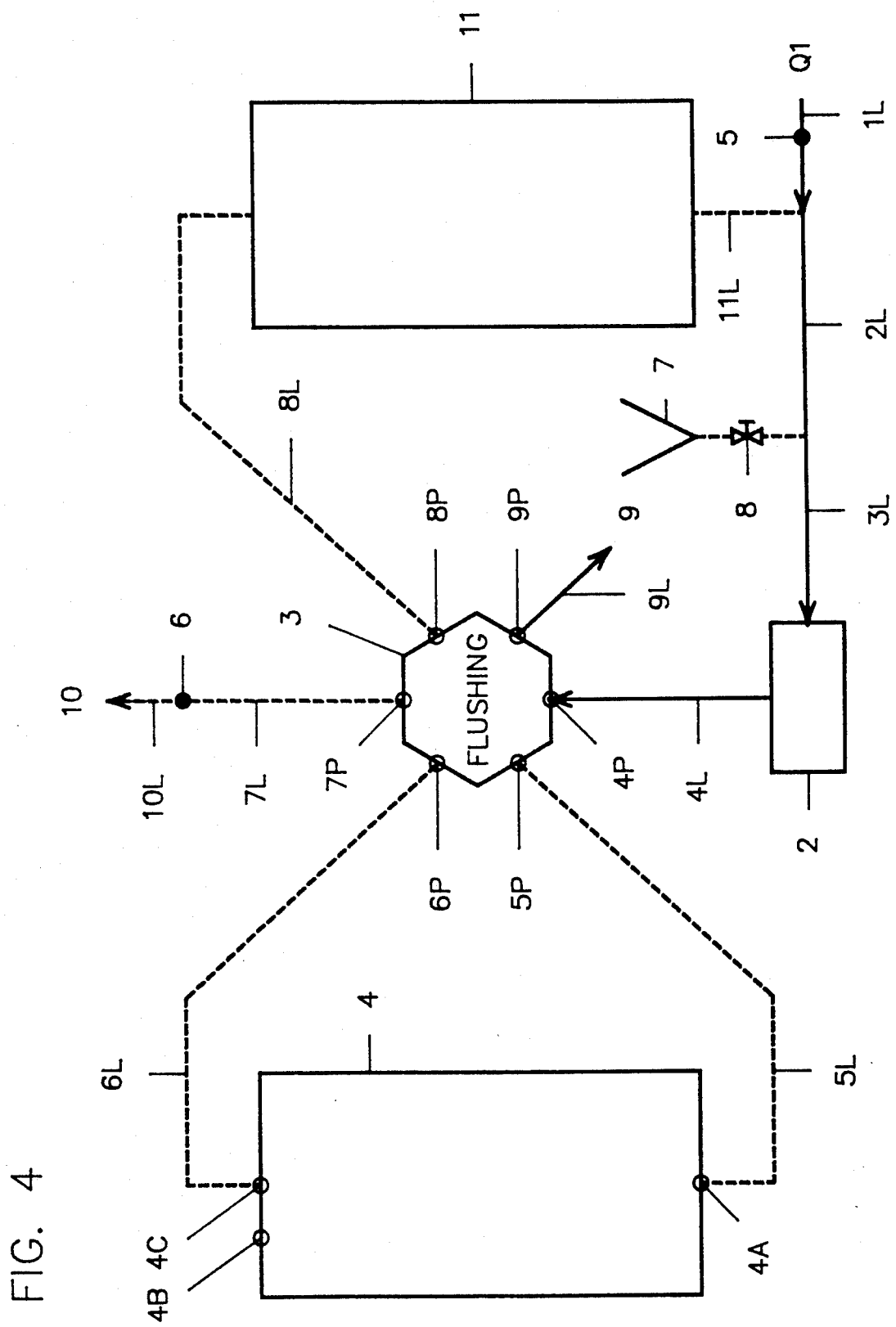

Referring to FIG. 4, the central flow control 3 receives said influent liquid Q1 from said pump 2 and wastes said influent liquid Q1 immediately to said waste drain 9L during the flushing mode of operation. The influent Q1 is not pretreated. When operating said apparatus at the flushing mode by pumping and dialing the control flow control 3 to "flushing" (not shown), the on-off ports 5P, 6P, 7P, & 8P connecting to said pressure filter 4, process tank 11 and discharge pipe 7L are all closed, and the remaining ports 4P and 9P are open.

Figure 5:
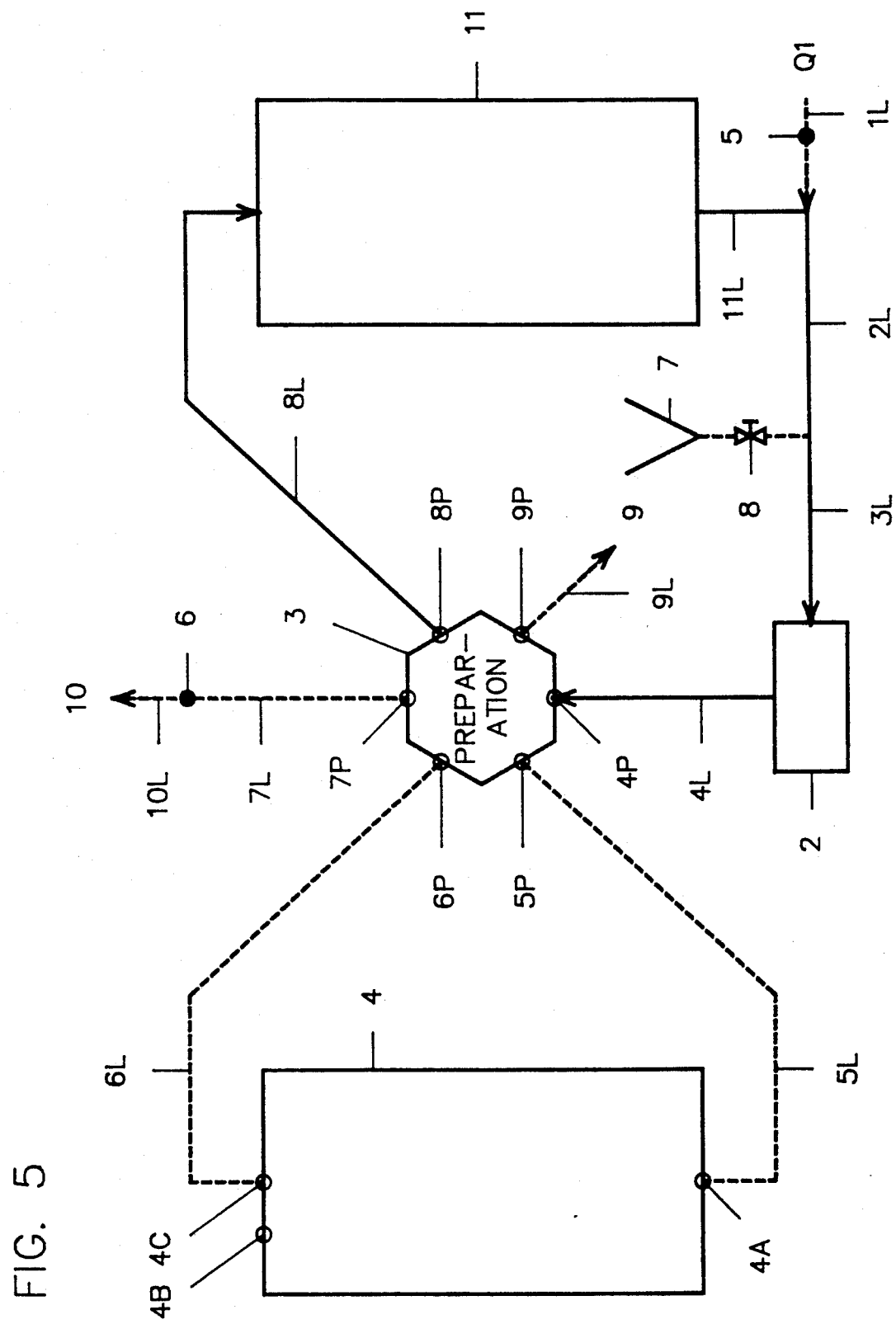

Referring to FIG. 5, the central flow control 3 receives said influent liquid Q1 containing chemical from chemical feed system 7 and from said pump 2, discharges said influent liquid Q1 containing chemical to said process tank 11 for chemical preparation during the preparation mode of operation. The chemical is fed to the influent liquid Q1 through the chemical feed system 7 and valve 8. The source of influent liquid Q1 is discontinued when there is enough liquid, and the valve 8 is closed when there is enough chemical for chemical preparation. When operating said apparatus at the chemical preparation mode by pumping and dialing the central flow control 3 to "preparation" (not shown), the on-off ports 5P, 6P, 7P & 9P connecting to said pressure filter 4, liquid discharge pipe 7L and waste drain 9L are closed and the remaining ports 4P & 8P of said control flow control 3 are open.

Figure 6:
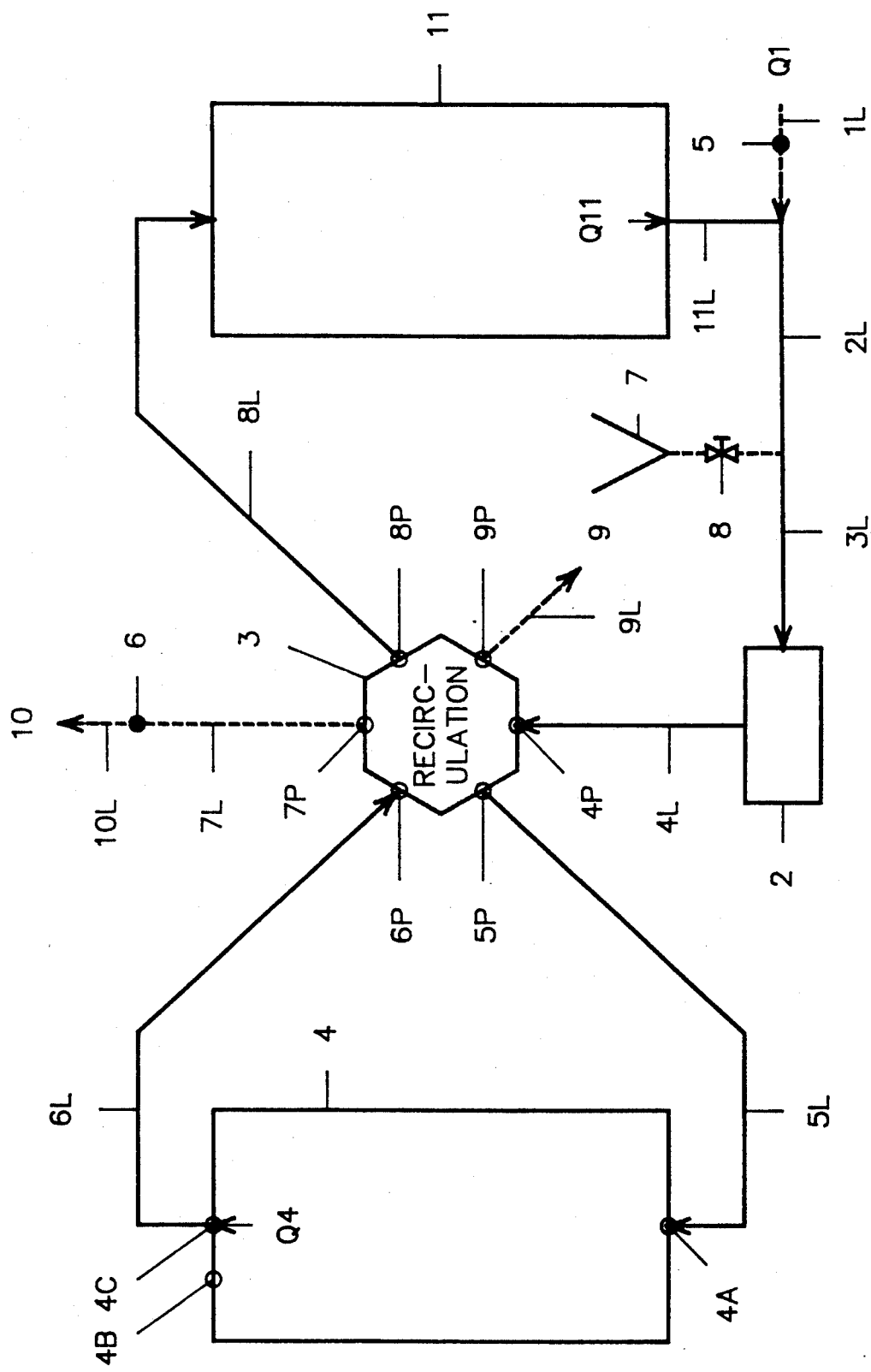

Referring to FIG. 6, the central flow control 3 receives the effluent Q11 from process tank 11, through pipes 11L, 2L, 3L, 4L and pump 2, discharges said process tank effluent Q11 to said pressure filter 4 through normal filter inlet 4A for regeneration of filter medium, and then receives the pressure filter effluent Q4 for recirculation to said process tank 11 during the recirculation mode of operation. When operating said apparatus at recirculation mode by pumping and dialing the central flow control 3 to "recirculation/precoat I," (not shown) but not pushing the precoat I button (not shown), the on-off ports 7P & 9P connecting to said liquid discharge pipe 7L and waste drain 9L, respectively, are closed, and the remaining ports 4P, 5P, 6P & 8P are open.

Figure 7:
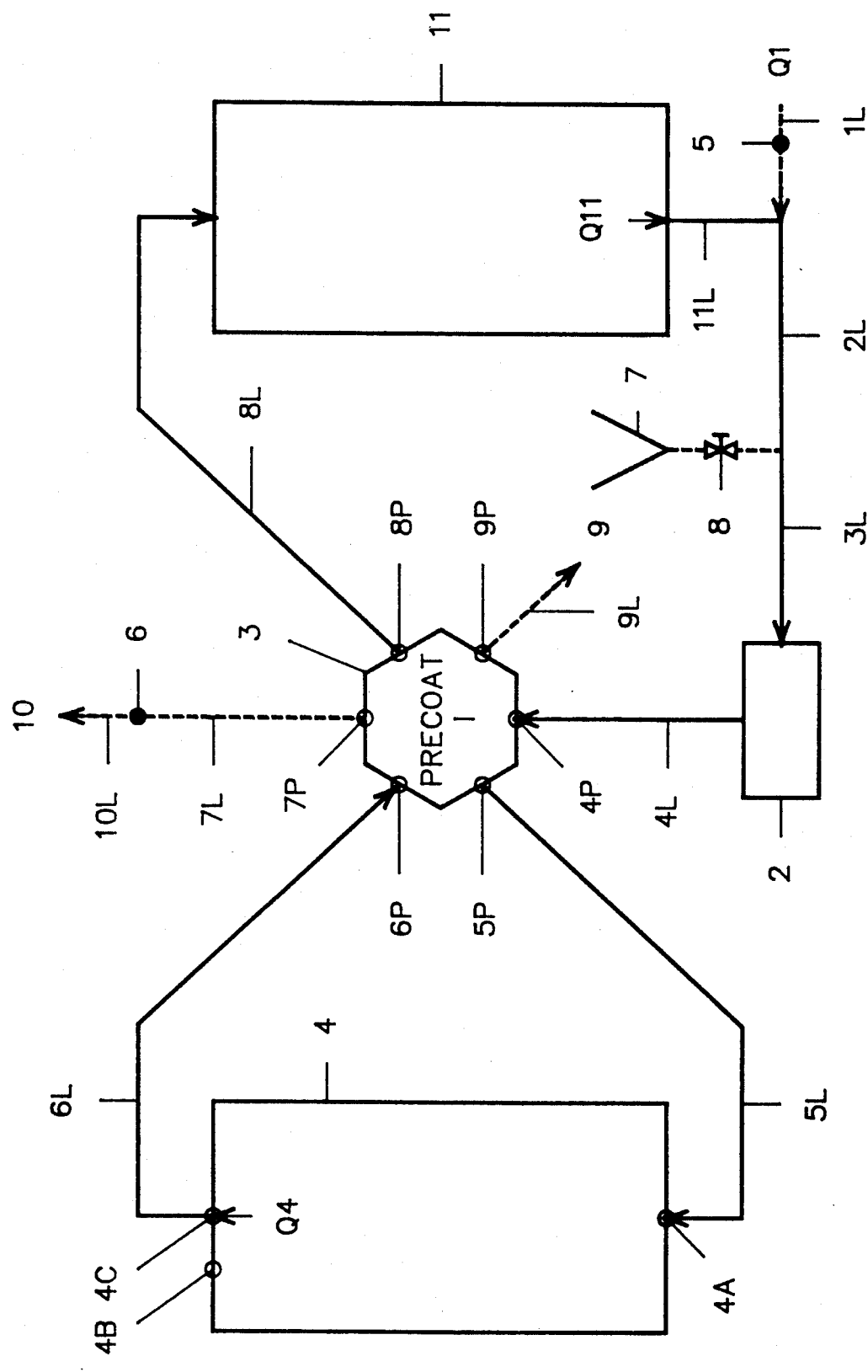

Referring to FIG. 7, when applicable, the central flow control 3 receives both said process tank effluent Q11 and the precoat slurry Q7 for precoating said pressure filter 4 during the precoat I mode of operation. The pressure filter effluent Q4 returns to said process tank 11 through said central flow control 3. Both the influent liquid Q1 and the precoat slurry Q7, will be shut-off when there are enough liquid and precoat for the precoating operation. When operating said apparatus at regular precoat I mode by pumping, pushing the precoat I button (not shown), and dialing the central flow control 3 to "recirculation/precoat I" (not shown), the on-off ports 7P & 9P connecting to said liquid discharge pipe 7L and waste drain 9L, respectively, are closed, and the remaining on-off ports 4P, 5P, 6P & 8P are open, when the filter media slurry is being recirculated through said pump 2, central flow control 3, pressure filter 4, central flow control 3, and process tank 11, for precoating said filter media onto said pressure filter 4.

Figure 8:
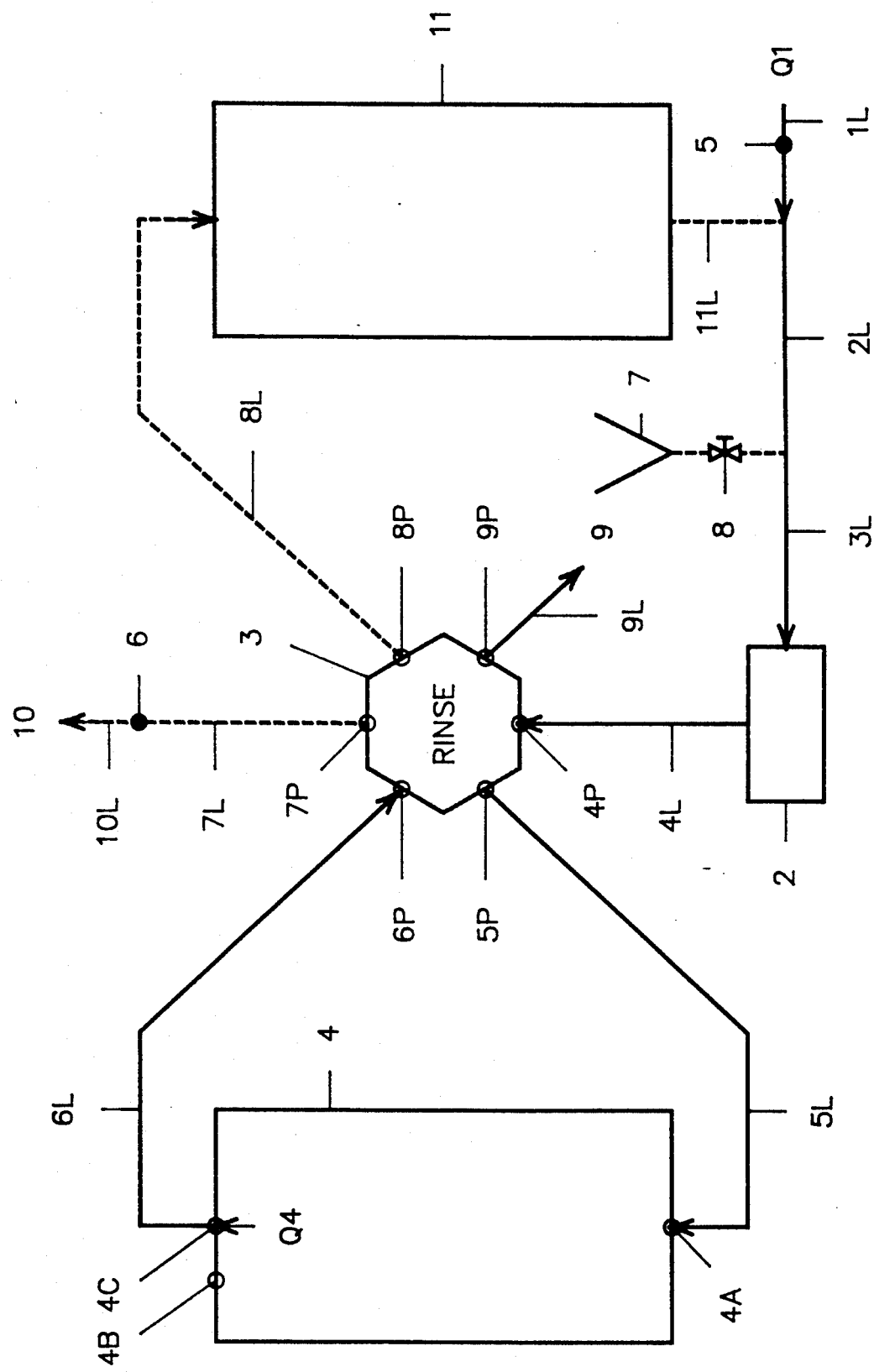

Referring to FIG. 8, when applicable, the central flow control 3 receives said influent liquid Q1, discharges it to said pressure filter 4 for rinsing its filter media and wasting the rinse water Q4 from said pressure filter 4 to said waste drain 9L, during the rinse mode of operation. When operating said apparatus at rinse (purging) mode by pumping and dialing the central flow control to "rinse/precoat II" (not shown), but not pushing the precoat II button (not shown), the on-off ports 7P & 8P connecting to said liquid discharge pipe 7L and process tank 11, respectively, are closed, and all remaining ports 4P, 5P, 6P & 9P of said central flow control 3 are open, when the on-off valve 8 of chemical feeder 7 is closed.

Figure 9:
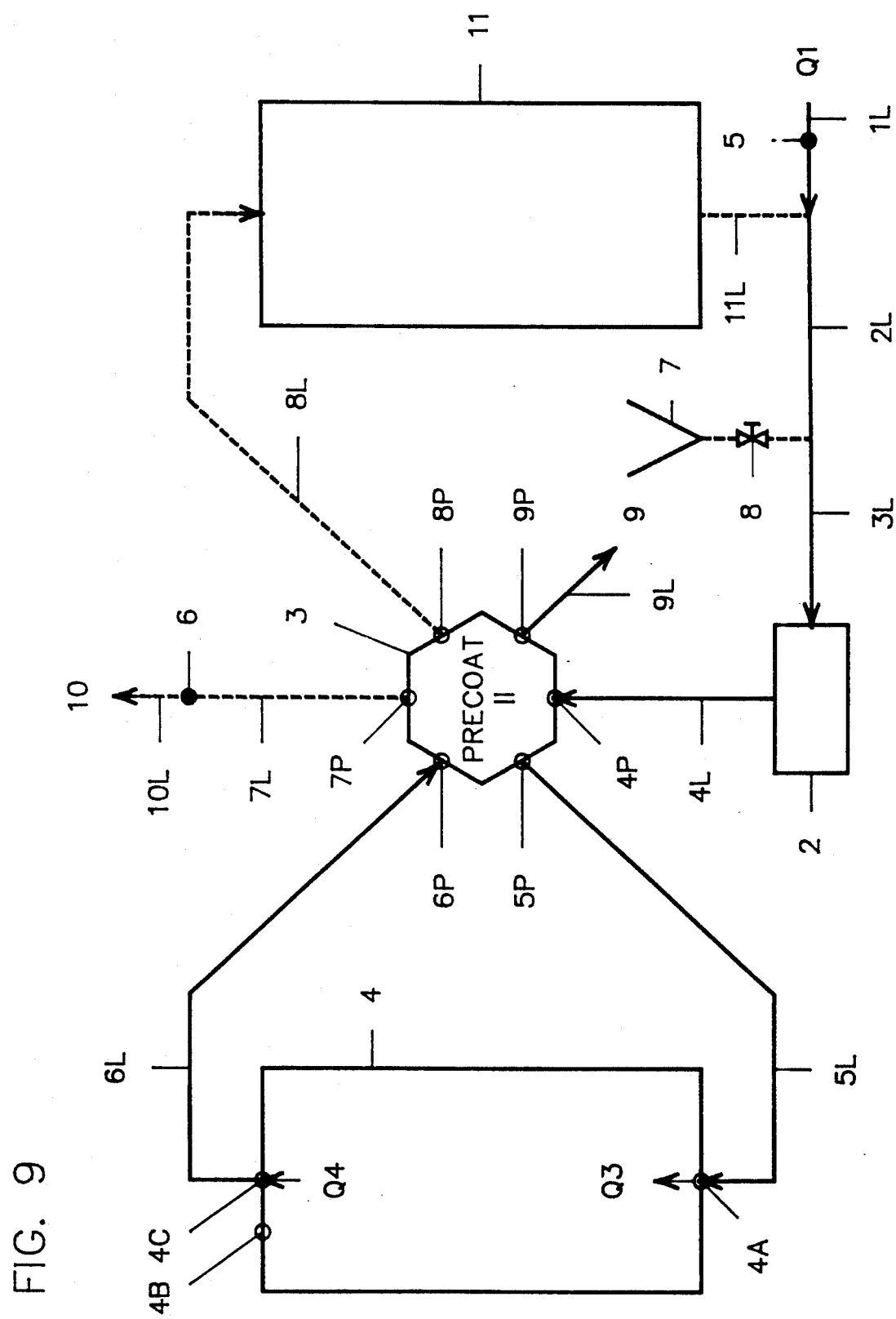

Referring to FIG. 9, when applicable, the central flow control 3 receives both said influent liquid Q1 and said precoat slurry Q7, discharges the influent liquid containing granular precoat media Q3 to said pressure filter 4 for precoating the septum (filter element), and accepts and discharges the pressure filter effluent Q4 to said waste drain 9L during the special precoat mode of operation. When operating said apparatus at special precoat mode by pumping, pushing the precoat II button (not shown), and dialing the central flow control 3 to "rinse/precoat II" (not shown), the on-off ports 7P & 8P connecting to said liquid discharge pipe 7L and process tank 11, respectively, are closed, and all remaining ports 4P, 5P, 6P & 9P of aid central flow control 3 are open, when the filter media slurry Q3, is being fed to the pressure filter 4.

In the case of the present invention, many conventional flow control valves for operation of a pressure filter and a process tank are eliminated and replaced by one central flow control 3, while at the same time, various modes of filtration operation are easily controlled by dialing. Various liquid filtration applications are achieved by proper selection of reactive/regenerative filter media and regeneration chemicals.

The simplication of the improved liquid filtration operation is accomplished by taking advantage of multiple on-off ports (not shown) inside of said central flow control 3. By dialing a selected mode of operation which is marked on said central flow control 3, only the applicable ports will be open, and the remaining non-applicable ports will be blocked simultaneously, thus directing the liquid to a proper treatment unit or pipe for treatment, processing or discharge.

More than one said central flow controls 3 can be adapted if multiple modules of said apparatus together with pretreatment 5 & 7 or post-treatment 6 are required.

The improvement of liquid treatment efficiency is accomplished by taking advantage of multiple reactive granular filter media inside of said pressure filter 4. By choosing one or more feasible filter media and feasible filter aids, only the target contaminants are to be efficiently and selectively removed from said influent liquid Q1. Thus, the liquid treatment goal can be achieved at an affordable cost.

The present invention provided by the inventors is designed to maximize the treatment efficiency while to minimize the operation effort, so the small municipalities, institutions, single families, or even individuals may adopt said apparatus for water purification, effluent treatment, or special liquid purification.

In most applications of the apparatus, the influent liquid Q1 is pumped to the apparatus at a velocity sufficient to ensure that liquid entering the apparatus system will flow through the center flow control 3 and other treatment units or pipes as described. Thus, it is intended that the apparatus will ordinarily take advantage of the relatively high energy level imported to the liquid by pumping equipment from a pump 2.

Also, it should be noted that the process tank 11 is essential only if the filter media regeneration (including filter precoat) is intended. In the event that media regeneration is not intended, the process tank 11 is idled.

Finally, it should be noted that the process and apparatus provided by the present invention can be used for removal of not only suspended particles, but also living microorganisms and soluble iron, manganese, heavy metals, hardness, volatile organic compounds, and colloidal solids from contaminated river water, lake water, domestic sewage, industrial process liquid, storm run-off and swimming pool water.

What we claim as our invention is:

1. An improved filtration process for removing contaminants from a contaminated liquid comprising the following steps:
    (a) operating an apparatus comprising a piping system including an influent liquid pipe, effluent discharge pipes, a waste drain, and process pipes, an ultraviolet pretreatment means, a chemical feed system, a pump means, a process tank, a pressure filter means including reactive granular filter media and a filter septum, an ultraviolet post-treatment means, and a central flow control means in a filtration mode,
    (b) pumping the contaminated liquid to said influent liquid pipe of said apparatus,
    (c) disinfecting the contaminated liquid by said ultraviolet pretreatment means, as needed, and producing an ultraviolet pretreated liquid,
    feeding a chemical selected from the group consisting of oxine, hypochlorite, peroxide and permanganate, or combinations thereof, as needed, to the ultraviolet pretreated liquid for chemical pretreatment and producing an ultraviolet and/or chemical pretreated liquid,
    (e) pumping the ultraviolet and/or chemical pretreated liquid to said central flow control means to said pressure filter means which comprises reactive granular filter media and a filter septum,
    (f) filtering the ultraviolet and/or chemical pretreated liquid by said reactive granular filter media supported by said filter septum inside said pressure filter means for removal of suspended, dissolved, living and non-living contaminants, and producing a filter effluent and a concentrate,
    (g) periodically discharging a portion of said concentrate from said pressure filter means though an on/off valve during a prolonged filtration operation,
    (h) discharging the filter effluent from said pressure filter means through said central flow control means to said effluent discharge pipe where the filter effluent is treated by the ultraviolet post-treatment means, and producing a post-treated effluent or a product liquid,
    (i) periodically turning said central flow control means manually or automatically from said filtration mode to a backwash mode for backwashing said pressure filter means at a liquid flow direction opposite to that of the filtration mode using the ultraviolet and/or chemical pretreated liquid and producing, then discharging a backwash wastewater from said pressure filter and said central flow control means to said waste drain for disposal,
    (j) turning said central flow control means manually or automatically from any previous operational mode to a rinse mode for rinsing said pressure filter means at a liquid flow direction identical to that of the filtration mode with said ultraviolet and/or chemical pretreated liquid and producing, then discharging a rinse wastewater from said pressure filter means and said central flow control means to said waste drain for disposal,
    (k) turning said central flow control means manually or automatically from said rinse mode to the filtration mode again for the filtration operation, for producing another filter effluent and another concentrate, and repeating steps (a) through (h),
    (l) turning said central flow control means manually or automatically from any previous operational mode to a bypass mode, allowing the ultraviolet pretreated liquid to bypass said pressure filter means and to be post-treated by said ultraviolet post-treatment means for producing a non-filtered but disinfected product liquid,
    (m) periodically turning said central flow control means manually or automatically from any previous operational mode to a flushing mode for flushing the influent liquid pipe and the ports of said central flow control means and producing, then discharging a flushing wastewater to said waste drain for disposal,
    (n) manually or automatically turning said central flow control means from any previous operational mode to a preparation mode for preparing a chemical solution in said process tank, using said contaminated liquid and chemical from said chemical feed system,
    (o) turning said central flow control means manually or automatically from any previous operational mode to a recirculation mode for recycling said chemical solution the entire apparatus to regenerate said reactive granular filter media without discharging said product liquid or said wastewater,
    (p) turning said central flow control means manually or automatically from any previous operational mode to a first precoat mode for precoating said septum with said reactive granular filter media inside said pressure filter means by recirculation of the effluent of said process tank and said reactive granular filter media from said chemical feed system, (q) turning aid central flow control means manually or automatically from any previous operational mode to a second precoat mode for continuously precoating said septum with said reactive granular filter media inside said pressure filter means with said contaminated liquid and said reactive granular filter media from said chemical feed system, and continuously discharging a wastewater to said waste drain, and (r) turning said central flow control means manually or automatically from either said first precoat mode or said second precoat mode to the rinse mode for rinsing and then to the filtration mode for normal filtration operation and producing the product liquid.

2. Filtration method as claimed in claim 1, wherein said filter element is made of porous stainless steel, mild steel, plated steel, alloy, ceramic, or plastic medium, or combinations thereof.

3. Filtration method as claimed in claim 1, wherein said reactive granular filter media in said pressure filter means is selected from the group consisting of sand, greensand, granular activated carbon, manganese dioxide, neutralizing sand, granular activated alumina, ion exchange resins, coal, diatomaceous earth, polymeric adsorbent, bacteriostatic filter medium, granular metal medium, or combinations thereof.

4. Filtration method as claimed in claim 1, wherein said chemical feed system and said process tank have means to feed and mix, respectively, reactive granular filter media when precoat filtration is intended.

5. Filtration method as claimed in claim 1, wherein said chemical feed system and said process tank have means to feed and mix, respectively, the regenerating chemical for regeneration of filter media inside said pressure filter during regeneration operation.

6. A liquid filtration apparatus comprising:
(a) a complete piping system comprising an influent liquid pipe, effluent discharge pipes, a waste drain, and process pipes; and influent liquid pipe leading a contaminated liquid into the apparatus, (b) an ultraviolet pretreatment means connected to said influent liquid pipe of said piping system, for treating the incoming contaminated liquid and producing an ultraviolet pretreated liquid, (c) a chemical feed system connected to said piping system and said ultraviolet pretreatment means arranged for selectively feeding a chemical to precoat a septum inside a pressure filter means with reactive granular filter media, regenerating said reactive granular filter media inside said pressure filter means with regenerating chemical or treating the ultraviolet pre-treated liquid with ozone or chlorine and producing a chemical pretreated liquid, (d) a pump means connected to said piping system downstream of said chemical feed system for providing energy to move the ultraviolet and/or chemical pretreated liquid throughout the entire apparatus, (e) a central flow control means connected to said piping system downstream of said pump means, and comprising a handle for manual or automatic dialing, a wide-open influent port and multiple on-off ports, for directing a body of said pretreated liquid from the pump means to proper flow direction, (f) said pressure filter means connected to said piping system and said central flow control means, normally operated in a crossflow hydraulic pattern, and containing both the filter element (septum) and the reactive granular filter media for purifying the ultraviolet and/or chemical pretreated liquid from said central flow control means, (g) a process tank connected to said piping system and said central flow control means for preparing and storing regenerating chemical or filter aids (including said reactive granular filter media) to regenerate said filter media with said regenerating chemicals or to precoat the septum with said filter aids inside said pressure filter means, (h) a first effluent discharge pipe connected to said central flow control means for discharging the liquid from said central flow control means, (i) said waste drain connected to said central flow control means for discharging a wastewater, (j) an ultraviolet post-treatment means connected to said first effluent discharge pipe for post-treating the liquid from said central flow control means and producing a product liquid, (k) a second effluent discharge pipe connected to said ultraviolet post-treatment means for discharging the product liquid, and (l) said process pipes of said piping system connecting the influent liquid pipe, said ultraviolet pretreatment means, said chemical feed system, said pump means, said central flow control means, said pressure filter means, said process tank, said ultraviolet post-treatment means, said first effluent discharge pipe, said second effluent discharge pipe, and said waste drain; said piping system further being equipped with flow meters, pressure gauges and safety valves.

7. Apparatus as claimed in claim 6, wherein said central flow control means comprises a wide-open inlet port, an on-off port to said pressure filter means, an on-off port from said pressure filter means, an on-off outlet port to said first effluent discharge pipe, an on-off port to said process tank, and an on-off outlet port to said waste drain, and is clearly marked.

8. Apparatus as claimed in claim 6, wherein said pressure filter means is completely sealed and has means for operating said pressure filter means as an upflow-crossflow filter or a conventional upflow filter.

9. Apparatus as claimed in claim 6, wherein said pressure filter means is completely sealed and has means for reversing the flow direction and operating said pressure filter means as a downflow-crossflow filter or a conventional downflow filter.

10. Apparatus as claimed in claim 6, wherein said pressure filter means is equipped with at least one filter element for supporting reactive granular filter media either as precoat media or fixed bed filter media.

11. Apparatus as claimed in claim 6, wherein said pressure filter means has means for operating said pressure filter as a horizontal crossflow filter means, or a conventional horizontal flow filter.

12. Apparatus as claimed in claim 6, wherein said filter element is coated with the reactive granular filter media as precoat media, or is packed with said reactive granular filter media as fixed bed filter media.

13. Apparatus as claimed in claim 6, wherein said filter element is made of porous stainless steel, mild steel, plated steel, alloy, ceramic, or plastic medium, or combinations thereof.

14. Apparatus as claimed in claim 13, wherein said porous plastic medium is selected from the group consisting of polyethylene, nylon and PVC, or combinations thereof.

15. Apparatus as claimed in claim 6, wherein said filter element is wrapped up with a porous expandable elastic sleeve to support the precoat filter media for enhancement of a precoat filtration operation.

16. Apparatus as claimed in claim 6, wherein said reactive granular filter media is selected from the group consisting of granular metal medium, manganese dioxide, diatomaceous earth, regular granular activated carbons, bacteriostatic filter medium, granular activated alumina, ion exchange resins, green sand, neutralizing sand, coal and polymeric adsorbent, or combinations thereof.

17. Apparatus as claimed in claim 6, wherein said reactive granular filter media in said pressure filter means are precoated on the surface of said filter element with more than one layer of media and with coarser media to be coated on an outside layer.

18. Apparatus as claimed in claim 6, wherein said reactive granular filter media are packed as fixed bed filter media for operating said pressure filter means as a fixed bed filter or are coated as precoat filter media for operating said pressure filter as a precoat filter.

19. Apparatus as claimed in claim 6, wherein said regenerating chemical (potassium permanganate, sodium, chloride), an acid, a base, a disinfectant, a filter aid and a precoat chemical, or combinations thereof.

20. Apparatus as claimed in claim 6, wherein said regenerating chemical is sodium chloride or a base for regeneration of anion exchange resins and is sodium chloride or acid for regeneration of cation exchange resins.

* * * * *